United States Patent
Kadowaki et al.

(10) Patent No.: US 10,866,148 B2
(45) Date of Patent: Dec. 15, 2020

(54) DETECTION DEVICE AND IMAGE FORMING APPARATUS

(71) Applicant: SHARP KABUSHIKI KAISHA, Sakai (JP)

(72) Inventors: Hideaki Kadowaki, Sakai (JP); Masafumi Sakamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 27 days.

(21) Appl. No.: 16/256,753

(22) Filed: Jan. 24, 2019

(65) Prior Publication Data

US 2019/0234812 A1   Aug. 1, 2019

(30) Foreign Application Priority Data

Jan. 26, 2018   (JP) .................. 2018-011701

(51) Int. Cl.
| | | |
|---|---|---|
| *G01L 1/00* | (2006.01) | |
| *G01L 1/04* | (2006.01) | |
| *G03G 15/00* | (2006.01) | |
| *G03G 21/16* | (2006.01) | |
| *G01D 5/02* | (2006.01) | |

(52) U.S. Cl.
CPC ............. *G01L 1/046* (2013.01); *G01D 5/02* (2013.01); *G03G 15/50* (2013.01); *G03G 21/1633* (2013.01); *G03G 15/55* (2013.01)

(58) Field of Classification Search
CPC .......... G01L 1/046; G01D 5/02; G03G 15/50; G03G 21/1633; G03G 15/55

USPC ..................................................... 73/862.621
See application file for complete search history.

(56) References Cited

U.S. PATENT DOCUMENTS

| | | | | |
|---|---|---|---|---|
| 3,655,953 | A * | 4/1972 | Gubelmann | G06C 15/26 235/137 |
| 6,213,235 | B1 * | 4/2001 | Elhardt | B62D 25/10 180/69.2 |
| 6,384,990 | B1 * | 5/2002 | Holdener | G02B 7/04 359/811 |
| 2006/0210387 | A1 * | 9/2006 | Saeki | B25J 9/107 414/744.5 |
| 2012/0010539 | A1 * | 1/2012 | Yachi | H01H 13/06 601/2 |
| 2015/0219439 | A1 * | 8/2015 | Kondoh | H01L 21/67259 356/614 |
| 2017/0248888 | A1 * | 8/2017 | Izumichi | G03G 15/5062 |

FOREIGN PATENT DOCUMENTS

JP     H10-199364 A     7/1998

* cited by examiner

*Primary Examiner* — Max H Noori
(74) *Attorney, Agent, or Firm* — ScienBiziP, P.C.

(57) ABSTRACT

A detection device according to a first aspect includes a first arm, a second arm, and a detection unit having two states as output. The first arm and the second arm each have a corresponding pressure receiving portion pushed by one of detection targets and are respectively rotatable about rotation axes as rotation centers along the same straight line such that the first arm and the second arm have different positions when the corresponding pressure receiving portion is pushed and not pushed by one of the detection targets. The output of the detection unit is switched to one of the two states in accordance with the positions of the arms.

8 Claims, 10 Drawing Sheets

DETECTION DEVICE AND IMAGE FORMING APPARATUS

BACKGROUND

1. Field

The present disclosure relates generally to a detection device and an image forming apparatus and, more particularly, to a detection device detecting the state of a detection target and an image forming apparatus.

2. Description of the Related Art

In the related art, it is known to provide a door opening and closing detection device detecting door opening and closing in electronic equipment, a vehicle, a ship, a building, another mechanical apparatus, or the like, which is disclosed in, for example, Japanese Unexamined Patent Application Publication No. 10-199364. The door opening and closing detection device described in Japanese Unexamined Patent Application Publication No. 10-199364 is provided with one switch detecting the opening and closing of two doors disposed adjacent to each other when closed. This door opening and closing detection device further includes one operating member operating a switch operating element of a switch between a position where the switch operating element is pressed and a position where the pressing of the switch operating element is released in accordance with the opening and closing operations of the two doors. As one of the doors is opened, the operating member rotates to the position where the pressing of the switch operating element is released. As the other door is opened, the operating member performs a parallel movement to the position where the pressing of the switch operating element is released.

In the door opening and closing detection device described in Japanese Unexamined Patent Application Publication No. 10-199364, the single operating member is caused to perform two different operations, one being the parallel movement and the other being the rotation. For this reason, the door opening and closing detection device described in Japanese Unexamined Patent Application Publication No. 10-199364 has a problem in that it is not easy to achieve a design for a stable operating member operation, that is, a design for stabilizing detection of a detection target.

The present disclosure has been made in view of the above points, and it is desirable to provide a detection device and an image forming apparatus with which detection target state detection is stabilized with ease.

SUMMARY

A detection device according to an aspect of the present disclosure includes a first arm, a second arm, and a detection unit. The first arm and the second arm each have a corresponding pressure receiving portion pushed by one of detection targets different from each other. The detection unit has two states as output. The first arm and the second arm are respectively rotatable about rotation axes as rotation centers along the same straight line such that the first arm and the second arm have different positions when the corresponding pressure receiving portion is pushed by the detection target and when the corresponding pressure receiving portion is not pushed by the detection target. The output of the detection unit is switched to one of the two states in accordance with the positions of the first arm and the second arm.

An image forming apparatus according to an aspect of the present disclosure includes the detection device described above, an image forming unit, a first cover, and a second cover. The image forming unit performs image formation. The first cover covers at least a part of the image forming unit as the detection target pushing the pressure receiving portion of the first arm. The second cover covers at least a part of the image forming unit as the detection target pushing the pressure receiving portion of the second arm.

DESCRIPTION OF THE EMBODIMENTS

(1) Overview

Figure 1A:
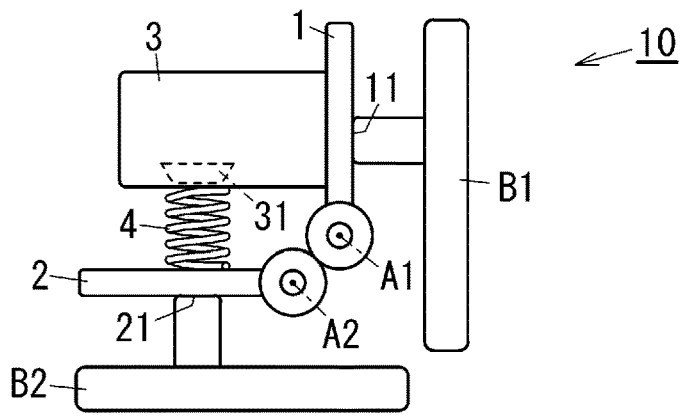
FIGS. 1A to 1C are schematic diagrams of a detection device according to an embodiment of the present disclosure.
Figure 1B:
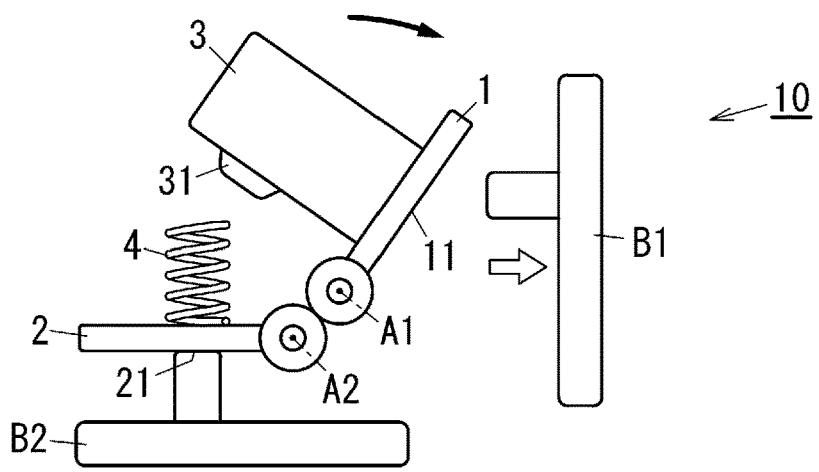
Figure 1C:
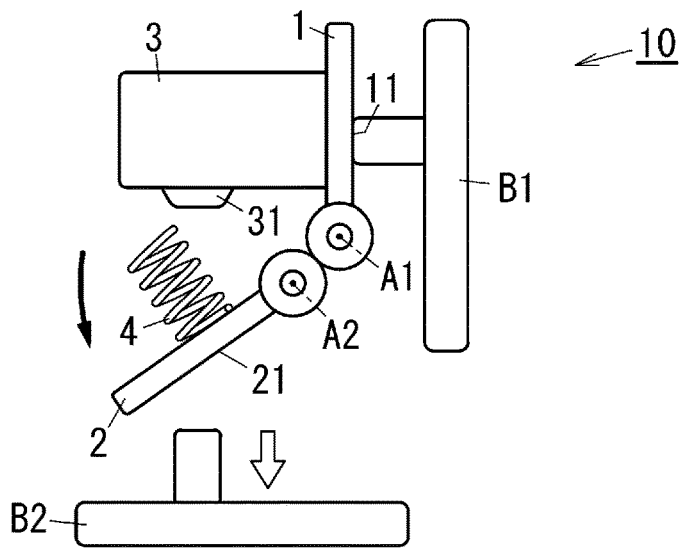

Hereinafter, an overview of a detection device 10 according to an embodiment will be described with reference to FIGS. 1A to 1C. In FIGS. 1A to 1C, components of the detection device 10 of the present embodiment are illustrated in a simplified manner. The detection device 10 of the present embodiment is a device for detecting the states of two detection targets B1 and B2 with one detection unit 3. In the present embodiment, the two detection targets B1 and B2 are a first cover 141 and a second cover 142 of an image forming apparatus 100, which will be described later (see FIGS. 2 and 3). The states of the two detection targets B1 and B2 are the opening and closing states of the first cover 141 and the second cover 142. In the following description, the detection target B1 will also be referred to as "first detection target B1" and the detection target B2 will also be referred to as "second detection target B2" for convenience of description.

As illustrated in FIG. 1A, the detection device 10 is provided with a first arm 1, a second arm 2, the detection unit 3, and an elastic body 4. The first arm 1 and the second arm 2 each have the corresponding pressure receiving portion 11 and 21 pushed by the different detection targets B1 and B2, respectively. The first arm 1 is capable of rotating (pivoting) about a rotation axis A1 as a rotation center so as to have different positions when the pressure receiving portion 11 is pushed by the first detection target B1 and when the pressure receiving portion 11 is not pushed by the first detection target B1. Likewise, the second arm 2 is capable of rotating about a rotation axis A2 as a rotation center so as to have different positions when the pressure receiving portion 21 is pushed by the second detection target B2 and when the pressure receiving portion 21 is not pushed by the second detection target B2. The rotation axes A1 and A2 are imaginary axes and are along the same straight line (not illustrated).

In the following description, the pressure receiving portion 11 of the first arm 1 will also be referred to as "first pressure receiving portion 11" and the pressure receiving portion 21 of the second arm 2 will also be referred to as "second pressure receiving portion 21" for convenience of description. In the following description, the rotation axis A1 that is the rotation center of the first arm 1 will also be referred to as "first rotation axis A1" and the rotation axis A2 that is the rotation center of the second arm 2 will also be referred to as "second rotation axis A2" for convenience of description.

In the present embodiment, a state where the first pressure receiving portion 11 is pushed by the first detection target B1 corresponds to a state where the first cover 141 is closed. A state where the first pressure receiving portion 11 is not pushed by the first detection target B1 corresponds to a state where the first cover 141 is open. In the present embodiment, a state where the second pressure receiving portion 21 is pushed by the second detection target B2 corresponds to a state where the second cover 142 is closed. A state where the second pressure receiving portion 21 is not pushed by the second detection target B2 corresponds to a state where the second cover 142 is open.

The detection unit 3 has two states as output. In the present embodiment, the detection unit 3 is a momentary-type microswitch having an actuator 31. The contact point of the detection unit 3 is a make contact point (a contact point). As illustrated in FIG. 1A, the output of the detection unit 3 is put into an ON state when the actuator 31 is pushed with a force equal to or greater than a predetermined value. As illustrated in FIG. 1B or 1C, the output of the detection unit 3 is put into an OFF state when the actuator 31 is not pushed with the force equal to or greater than the predetermined value. In other words, the output of the detection unit 3 switches between two states, one being the ON state and the other being the OFF state. In the present embodiment, the detection unit 3 is held by the first arm 1 or the second arm 2. Accordingly, the detection unit 3 moves as the first arm 1 rotates.

The elastic body 4 is disposed between the detection unit 3 and at least one of the first arm 1 and the second arm 2 (here, the second arm 2). In the present embodiment, the elastic body 4 is a metallic coil spring. A first end of the elastic body 4 (lower end in FIG. 1A) is held by the second arm 2. A second end of the elastic body 4 (upper end in FIG. 1A) is a free end. When the first pressure receiving portion 11 and the second pressure receiving portion 21 are respectively pushed by the first detection target B1 and the second detection target B2, the elastic body 4 is compressed by being sandwiched between the second arm 2 and the detection unit 3. In other words, the elastic body 4 causes an elastic force in a direction away from a detection target (here, the second detection target B2) to act on the detection unit 3.

The output of the detection unit 3 is switched to one of the two states in accordance with the positions of the first arm 1 and the second arm 2. An example of the operation of the detection device 10 will be described below. First, as illustrated in FIG. 1A, the actuator 31 of the detection unit 3 is pushed to the second arm 2 with a force equal to or greater than a predetermined value via the elastic body 4 when the first pressure receiving portion 11 and the second pressure receiving portion 21 are respectively pushed by the first detection target B1 and the second detection target B2. Accordingly, the output of the detection unit 3 is in the ON state. In this state, the elastic force that the elastic body 4 applies to the detection unit 3 and the force chat the first detection target B1 applies to the detection unit 3 via the first arm 1 are in equilibrium. In this state, the elastic force that the elastic body 4 applies to the second arm 2 and the force that the second detection target B2 applies to the second arm 2 are in equilibrium.

Here, it is assumed that the first detection target B1 is separated from the first pressure receiving portion 11 by, for example, a person moving the first detection target B1 with the detection device 10 in the state that is illustrated in FIG. 1A. Then, the force that the first detection target B1 applies to the detection unit 3 via the first arm 1 is lost and the elastic force that the elastic body 4 applies to the detection unit 3 causes the first arm 1 and the detection unit 3 to rotate in the clockwise direction in FIG. 1B as illustrated in FIG. 1B. Accordingly, the elastic body 4 is separated from the actuator 31 and the actuator 31 is not pushed with a force equal to or greater than a predetermined value, and thus the output of the detection unit 3 is switched from the ON state to the OFF state.

It is assumed that the second detection target B2 is separated from the second pressure receiving portion 21 by, for example, a person moving the second detection target B2 with the detection device 10 in the state that is illustrated in FIG. 1A. Then, the force that the second detection target B2 applies to the second arm 2 is lost and the elastic force that the elastic body 4 applies to the second arm 2 causes the second arm 2 to rotate in the counterclockwise direction in FIG. 1C as illustrated in FIG. 1C. Accordingly, the elastic body 4 is separated from the actuator 31 and the actuator 31 is not pushed with a force equal to or greater than a predetermined value, and thus the output of the detection unit 3 is switched from the ON state to the OFF state.

As described above, in the detection device 10, the single detection unit 3 detects whether or not the first pressure receiving portion 11 and the second pressure receiving portion 21 are pushed by the first detection target B1 and the second detection target B2, respectively. In other words, the single detection unit 3 of the detection device 10 detects whether both the first cover 141 and the second cover 142 are closed or at least one of the first cover 141 and the second cover 142 is open.

(2) Details

Hereinafter, the detection device 10 of the present embodiment and the image forming apparatus 100 will be described in detail. The image forming apparatus 100 is a piece of equipment provided with the detection device 10 of the present embodiment.

(2.1) Configuration of Image Forming Apparatus

First, an overall configuration of the image forming apparatus 100 of the present embodiment will be described with reference to FIGS. 2 to 4. In the present embodiment, the image forming apparatus 100 is an electrophotographic apparatus forming an image on a recording sheet or the like and is a multifunction peripheral (MFP) in which a copying machine function, a printer function, an image scanner function, a facsimile function, and the like are integrated.

Figure 2:
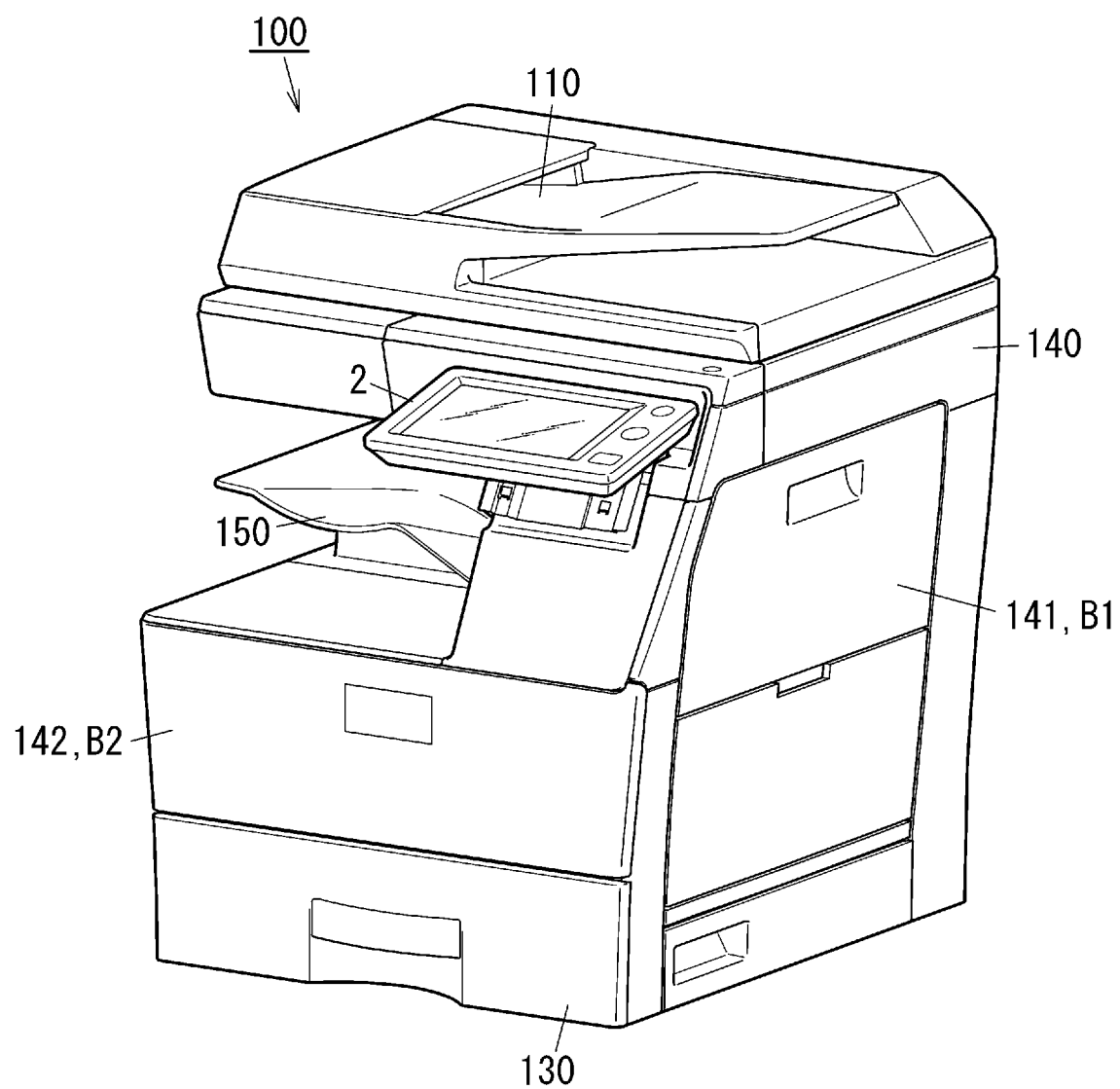
FIG. 2 is a schematic perspective view of an image forming apparatus provided with the detection device, illustrating a case where both a first cover and a second cover are closed.
Figure 3:
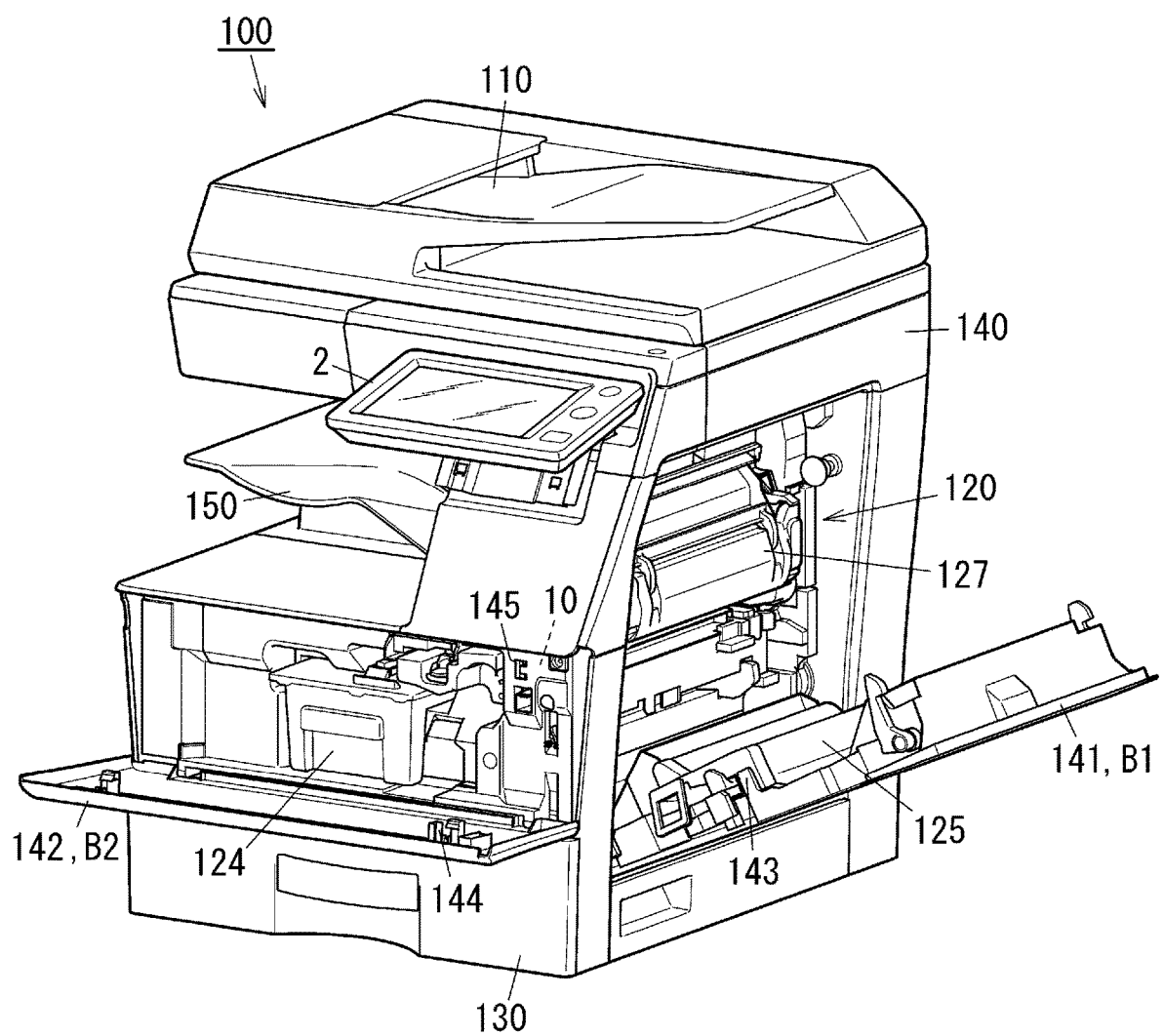
FIG. 3 is a schematic perspective view of the image forming apparatus, illustrating a case where both the first cover and the second cover are open.
Figure 4:
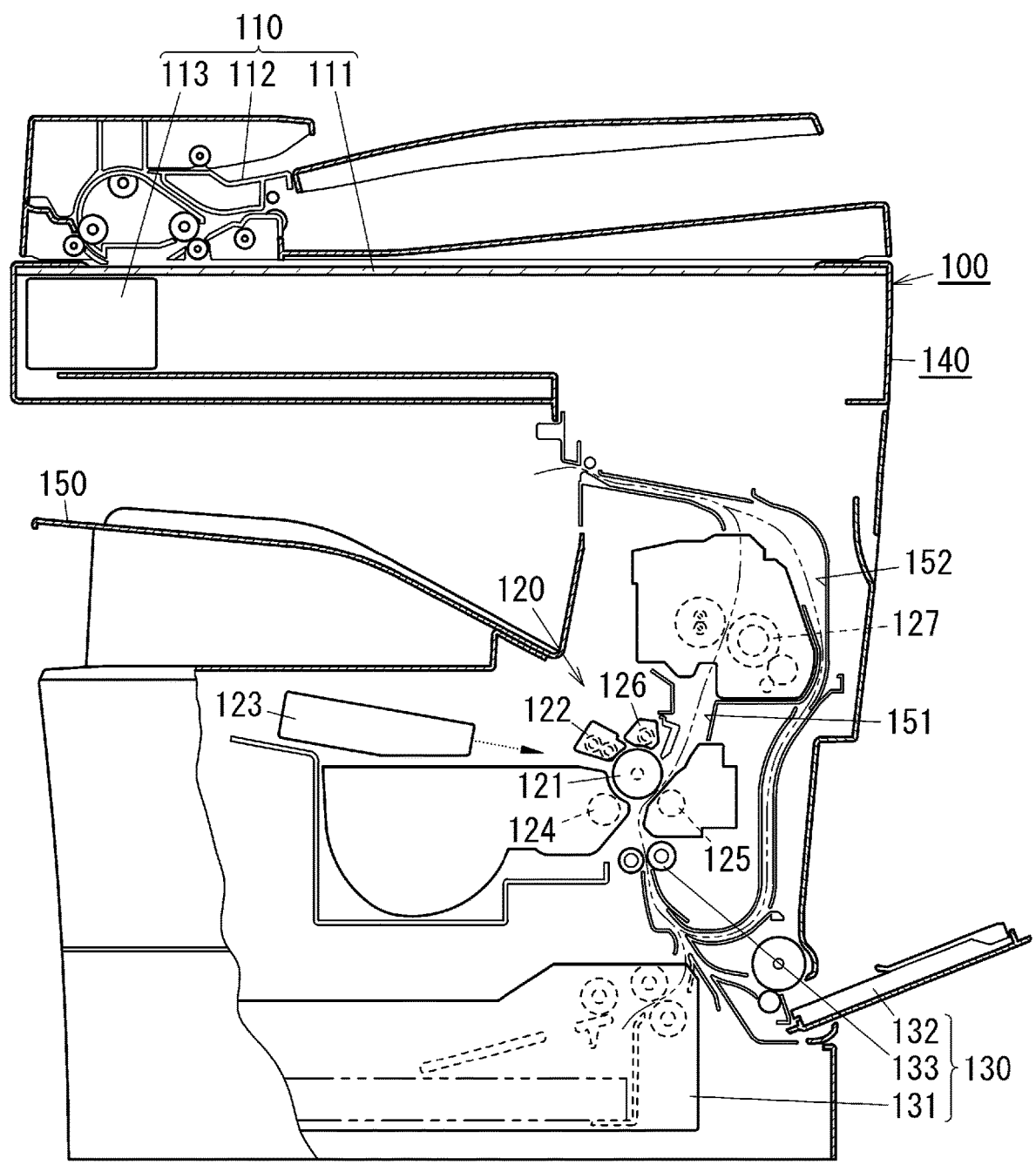
FIG. 4 is a schematic cross-sectional view of the image forming apparatus.

As illustrated in FIGS. 2 to 4, the image forming apparatus 100 is provided with the detection device 10, an image reading unit 110, an image forming unit 120, a sheet feeding unit 130, and an operation panel 2. The image forming apparatus 100 further includes one housing 140 that stores a part of the image reading unit 110, the image forming unit 120, and the sheet feeding unit 130.

The image reading unit 110 has a document table 111, an automatic document feeder (ADF) 112, and a document image reading unit 113. The document table 111 is made of transparent glass constituting the top plate of the housing 140. The automatic document feeder 112 automatically supplies a document onto the document table 111. The document image reading unit 113 scans and reads the image of the document that is placed on the document table 111 or the document that is supplied on the document table 111 by the automatic document feeder 112.

The image forming unit 120 is disposed below the image reading unit 110 and has a plurality of units performing an electrophotographic process (image formation). As illustrated in FIG. 4, the image forming unit 120 has a photoreceptor drum 121, a charging unit 122, an optical scanning unit 123, a developing unit 124, a transfer unit 125, a cleaning unit 126, and a fixing unit 127. The charging unit 122, the optical scanning unit 123, the developing unit 124, the transfer unit 125, and the cleaning unit 126 are disposed in this order so as to line up in the counterclockwise direction in FIG. 4 around the photoreceptor drum 121. The image forming unit 120 is disposed between the cleaning unit 126 and the charging unit 122 around the photoreceptor drum 121 and further has a destaticizing unit (not illustrated) for destaticizing the photoreceptor drum 121.

The charging unit 122 charges the photoreceptor drum 121 such that the surface of the photoreceptor drum 121 uniformly has a predetermined potential. The optical scanning unit 123 irradiates the surface of the charged photoreceptor drum 121 with light (laser light) and scans the surface of the photoreceptor drum 121 to form an electrostatic latent image on the surface of the photoreceptor drum 121. The developing unit 124 attaches charged toner to the electrostatic latent image formed on the surface of the photoreceptor drum 121 to visualize the electrostatic latent image and form a toner image. The transfer unit 125 transfers the visualized toner image to a recording sheet. The cleaning unit 126 removes the developer and the toner that remain on the photoreceptor drum 121 so that a new image (toner image) can be formed on the photoreceptor drum 121. The destaticizing unit destaticizes the surface of the photoreceptor drum 121 after cleaning so that the chargeability of the photoreceptor drum 121 is uniform. The fixing unit 127 fixes the toner image transferred on the recording sheet by the transfer unit 125 to the recording sheet by means of, for example, heat and/or pressure.

The sheet feeding unit 130 is disposed below the image forming unit 120 and supplies a recording sheet to the image forming unit 120. The sheet feeding unit 130 has at least one sheet cassette 131, a manual sheet feeding tray 132, and a resist roller 133. The image forming apparatus 100 takes out one recording sheet from either the at least one sheet cassette 131 or the manual sheet feeding tray 132 and transports the recording sheet such that the leading edge of the recording sheet bites into the nip portion of the resist roller 133. The resist roller 133 transports the recording sheet such that the recording sheet reaches the transfer unit 125 at a timing when the position of initiation of electrostatic latent image writing on the photoreceptor drum 121 coincides with the position of initiation of toner image transfer to the recording sheet.

The image forming apparatus 100 described above supplies a recording sheet from the sheet feeding unit 130 to the image forming unit 120 and discharges the toner image-fixed recording sheet to a sheet discharge tray 150 through a first transport path 151 in the housing 140. In addition, the image forming apparatus 100 has, in the housing 140, a second transport path 152 for switchback-transporting a recording sheet during recording sheet back surface printing.

The operation panel 2 is a unit for receiving user operations. As illustrated in FIG. 2 or 3, the operation panel 2 protrudes forward from the front surface of the upper end portion of the housing 140. In the present embodiment, the operation panel 2 has a tilt function that the direction of a surface 20 of the operation panel 2 is variable in the upward-downward direction. In other words, the operation panel 2 is held by the housing 140 in a state where the operation panel 2 is head-swingable relative to the housing 140.

As illustrated in FIGS. 2 and 3, the housing 140 has the first cover 141 and the second cover 142. Both the first cover 141 and the second cover 142 can be opened and closed by hand. In the housing 140, the detection device 10 is stored at a position facing the first cover 141 and the second cover 142.

The first cover 141 is a rectangular plate when viewed from the right side. The first cover 141 is rotatable, about the lower end portion of the first cover 141 as a rotation center, between a position where the transfer unit 125, the fixing unit 127, and the like stored in the housing 140 are covered and a position where the transfer unit 125, the fixing unit 127, and the like are exposed to the outside of the housing 140. A first projection 143 protrudes from the back surface of the first cover 141. The first projection 143 is provided so as to push the first pressure receiving portion 11 of the first arm 1 of the detection device 10 through an insertion hole (not illustrated) provided in the housing 140 in a state where the first cover 141 is closed. In other words, the first cover 141 is the first detection target B1 that pushes the first pressure receiving portion 11 of the first arm 1 and covers at least a part of the image forming unit 120 (here, the transfer unit 125, the fixing unit 127, and the like).

The second cover 142 is a rectangular plate when viewed from the front. The second cover 142 is rotatable, about the lower end portion of the second cover 142 as a rotation center, between a position where the developing unit 124 and the like stored in the housing 140 are covered and a position where the developing unit 124 and the like are exposed to the outside of the housing 140. A second projection 144 protrudes from the back surface of the second cover 142. In a state where the second cover 142 is closed, the second projection 144 pushes the second pressure receiving portion 21 of the second arm 2 of the detection device 10 through an insertion hole 145 provided in the housing 140. In other words, the second cover 142 is the second detection target B2 that pushes the second pressure receiving portion 21 of the second arm 2 and covers at least a part of the image forming unit 120 (here, the developing unit 124 and the like).

(2.2) Configuration of Detection Device

Next, the detection device 10 of the present embodiment will be described in detail with reference to FIGS. 5 to 9. In the following description, the longitudinal direction of the first arm 1 in a state where both the first cover 141 and the second cover 142 are closed will be referred to as the forward-rearward direction, the longitudinal direction of the second arm 2 in that state will be referred to as the leftward-rightward direction, and the axial direction of the rotation axes A1 and A2 in that state will be referred to as the upward-downward direction. Although arrows indicating the directions (upward, downward, leftward, rightward, forward, and rearward) are illustrated in FIGS. 5 to 9, the arrows are merely to assist with the description and are without entities. The definitions of the above-described directions do not limit the form of use of the detection device 10 of the present embodiment.

Figure 5:
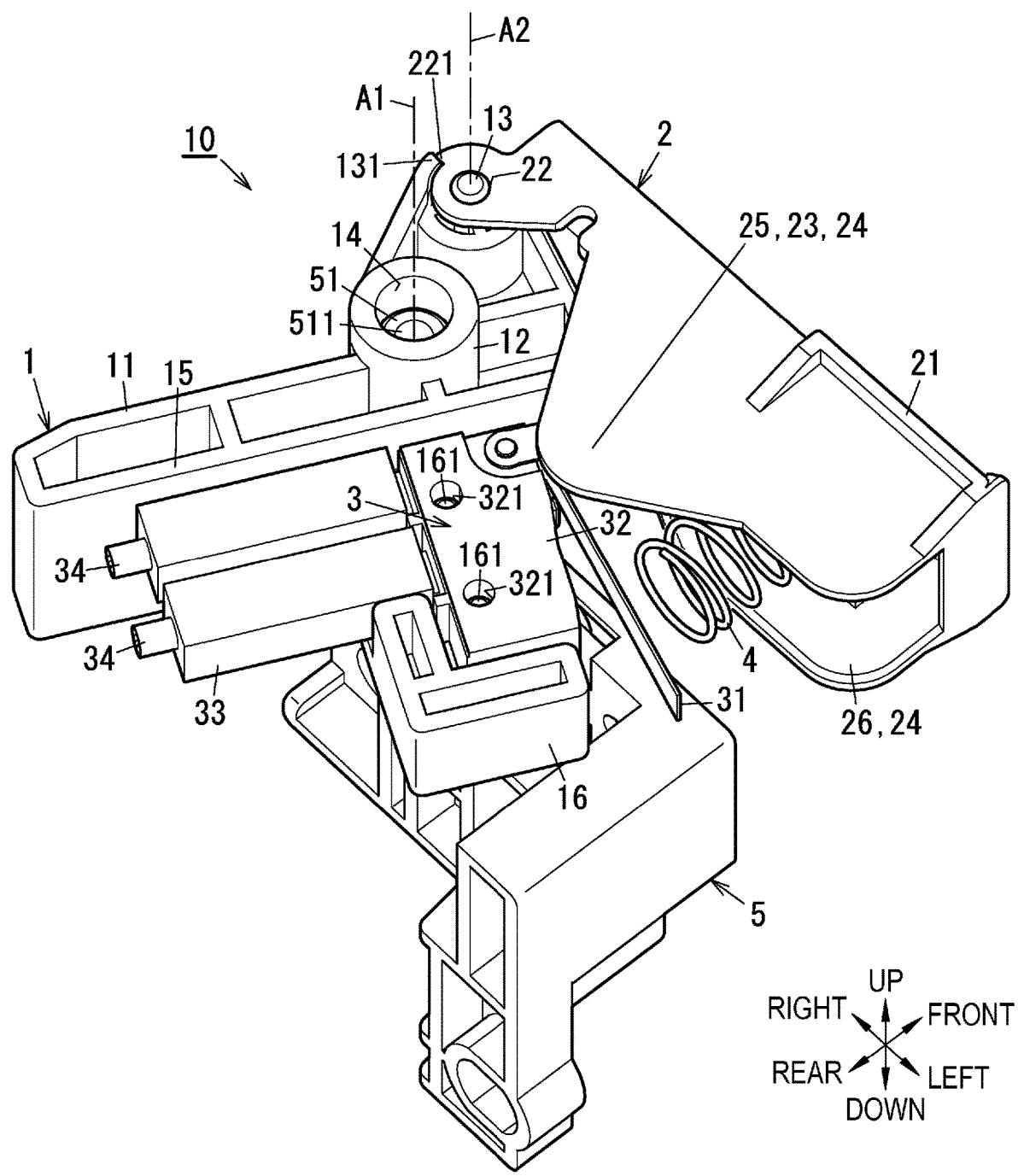
FIG. 5 is a perspective view of the detection device.
Figure 6:
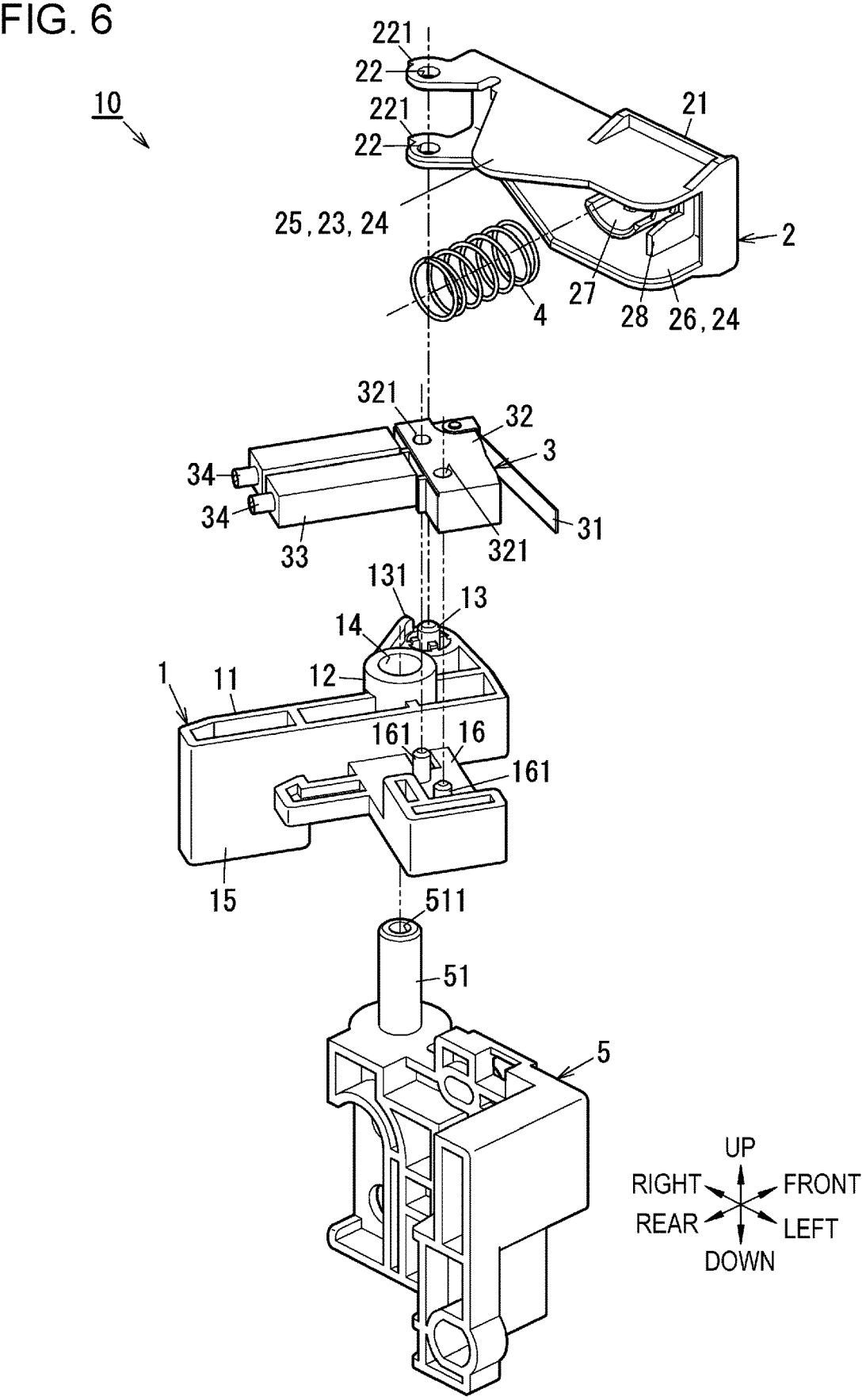
FIG. 6 is an exploded perspective view of the detection device.

As illustrated in FIGS. 5 and 6, the detection device 10 is provided with the first arm 1, the second arm 2, the detection unit 3, and the elastic body 4. The detection device 10 further includes a support body 5.

Figure 7:
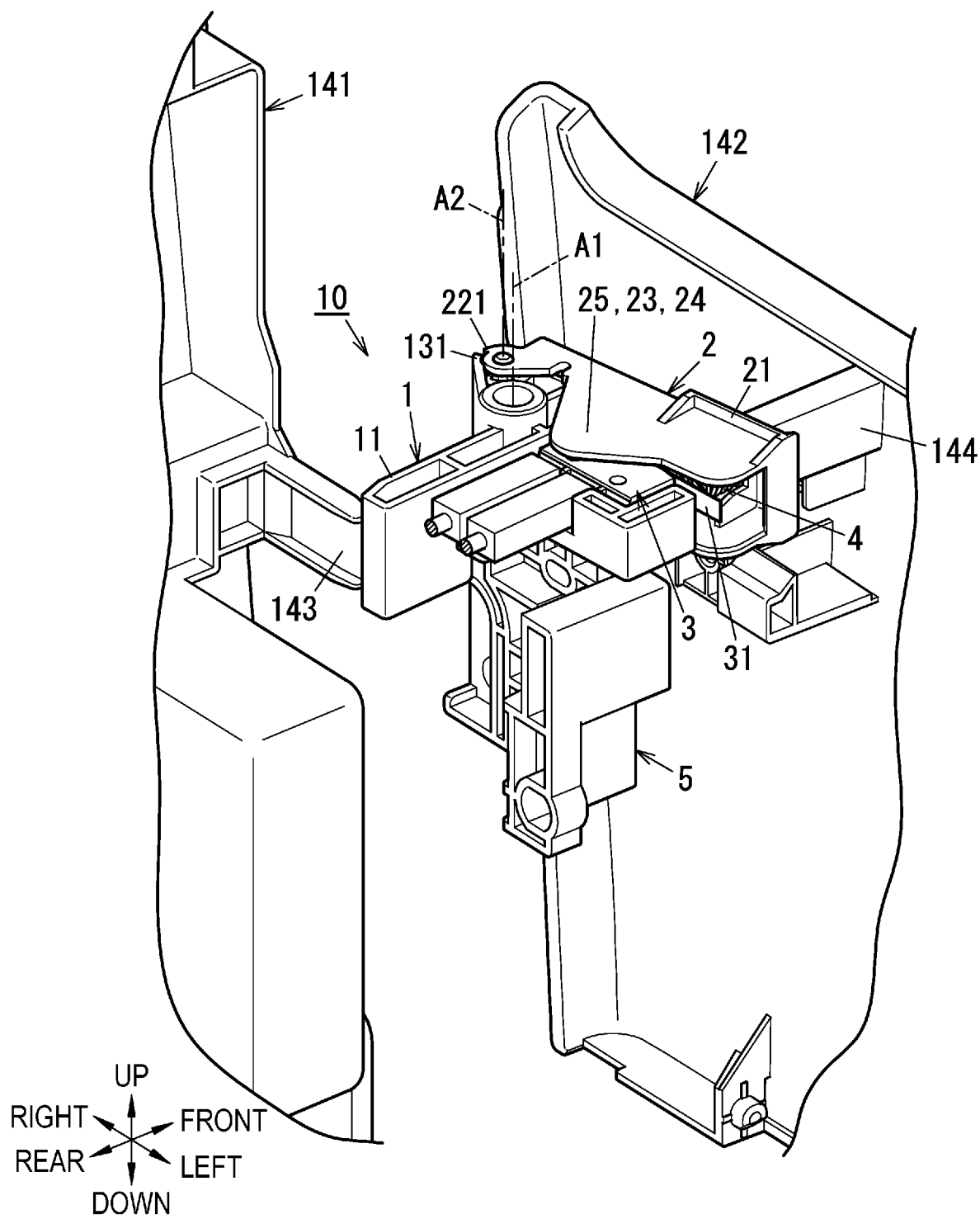
FIG. 7 is a perspective view of the detection device, illustrating a case where both the first cover and the second cover are closed.

The first arm 1 is a molded article that is long in one direction (forward-rearward direction in FIG. 7). The first arm 1 has a first wall (right wall) and a second wall (left wall) facing each other in the thickness direction (leftward-rightward direction). A part of the first wall of the first arm 1 is the first pressure receiving portion 11 pushed by the first projection 143 of the first cover 141. The second wall of the first arm 1 is a wall 15 separating a connecting portion 33 (described later) of the detection unit 3 and the first pressure receiving portion 11 from each other. In other words, the detection device 10 is provided with the wall 15. The wall 15 separates the connecting portion 33 from the first pressure receiving portion 11 of the arm that is the first arm 1 or the second arm 2 and holds the detection unit 3 (here, the first arm 1). The wall 15 is in the arm that is the first arm 1 or the second arm 2 and holds the detection unit 3 (here, the first arm 1).

The first arm 1 has a cylindrical bearing 12 that is long in the short direction (upward-downward direction). The inside of the bearing 12 is a hole 14 penetrating the first arm 1 in the short direction. A shaft 51 of the support body 5 to be described later is inserted in the hole 14. The first arm 1 is rotatable about the first rotation axis A1 as a rotation center, and the first rotation axis A1 is a center line of the shaft 51. In other words, the rotation axis (here, the first rotation axis A1) that is the rotation center of the arm (here, the first arm 1) which is one of the first arm 1 and the second arm 2 and has the hole 14 passes through the hole 14.

The first arm 1 has a pair of shafts 13 protruding in the short direction (upward-downward direction). In FIGS. 5 and 6, only one of the pair of shafts 13 that protrudes upward from the first arm 1 is illustrated and the shaft 13 that protrudes downward from the first arm 1 is not illustrated. The pair of shafts 13 are respectively inserted in a pair of shaft holes 22 of the second arm 2 to be described later. The first arm 1 has a pair of first stoppers 131 provided around the pair of shafts 13. Each of the pair of first stoppers 131 protrudes in the short direction of the first arm 1. In FIGS. 5 and 6, only one of the pair of first stoppers 131 that protrudes upward from the first arm 1 is illustrated and the first stopper 131 that protrudes downward from the first arm 1 is not illustrated. The pair of first stoppers 131 are provided so as to respectively hit a pair of second stoppers 221 of the second arm 2 to be described later once the angle that is formed by the first arm 1 and the second arm 2 reaches a predetermined angle (see FIG. 5).

The first arm 1 has a rectangular parallelepiped holding portion 16 protruding to the left from an intermediate portion in the longitudinal direction (forward-rearward direction) of the first arm 1. The detection unit 3 is placed on one surface (upper surface) of the holding portion 16. In addition, a pair of columnar pins 161 protruding upward are provided on one surface of the holding portion 16. The pair of pins 161 are respectively inserted in a pair of holding holes 321 of the detection unit 3 to be described later. The holding portion 16 holds the detection unit 3 in a state where the pair of pins 161 are respectively inserted in the pair of holding holes 321. In other words, the first arm 1 or the second arm 2 holds the detection unit 3 in a state of being movable in one direction (here, the direction that is along the center line of the pin 161).

The second arm 2 is a molded article that is long in one direction (leftward-rightward direction in FIG. 7). The second arm 2 has a first wall (front wall) and a second wall (rear wall) facing each other in the thickness direction (forward-rearward direction). A part of the first wall of the second arm 2 is the second pressure receiving portion 21 pushed by the second projection 144 of the second cover 142. An attachment portion 27 for attaching the elastic body 4 is provided on the second wall of the second arm 2. A guide unit 28 is provided on the second wall of the second arm 2. The guide unit 28 regulates a movement of the actuator 31 in the short direction of the actuator 31 of the detection unit 3 (upward-downward direction in FIG. 1).

A pair of circular bearings 22 are provided at one longitudinal end (right end) of the second arm 2. The pair of bearings 22 are separated from each other in the short direction (upward-downward direction) of the second arm 2. The second arm 2 is attached to the first arm 1 by the pair of shafts 13 of the first arm 1 being inserted into the pair of bearings 22, respectively. As illustrated in FIG. 7, in the present embodiment, the longitudinal direction of the first arm 1 and the longitudinal direction of the second arm 2 are substantially orthogonal to each other in a state where both the first cover 141 and the second cover 142 are closed. The second arm 2 is rotatable about the second rotation axis A2 as a rotation center, and the second rotation axis A2 is a center line of the pair of shafts 13.

In the present embodiment, the first rotation axis A1 as the rotation center of the first arm 1 and the second rotation axis A2 as the rotation center of the second arm 2 are different from each other. This configuration is advantageous in that the positional relationship between the first arm 1 and the detection unit 3 and the positional relationship between the second arm 2 and the detection unit 3 are individually adjusted with ease. Especially, in the present embodiment, the elastic body 4 is a coil spring, and thus adoption of this configuration facilitates adjustment such that the elastic body 4 hits the actuator 31 of the detection unit 3 at an appropriate angle. As a result, this configuration is advantageous in that buckling of the elastic body 4, which is a coil spring, is prevented with ease.

In the present embodiment, the relative positional relationship between the first rotation axis A1 as the rotation center of the first arm 1 and the second rotation axis A2 as the rotation center of the second arm 2 is fixed regardless of a rotational movement of the first arm 1 or the second arm 2. In other words, an the present embodiment, both the first rotation axis A1 and the second rotation axis A2 are defined by the first arm 1, and thus the positional relationship between the first rotation axis A1 and the second rotation axis A2 remains unchanged even when the first arm 1 and the second arm 2 move.

The pair of second stoppers 221 protruding in the radial direction of the bearing 22 are respectively provided around the pair of bearings 22 at one longitudinal end (right end) of the second arm 2. As described above, the pair of second stoppers 221 respectively hit the pair of first stoppers 131 once the angle formed by the first arm 1 and the second arm 2 reaches a predetermined angle. In other words, the rotation ranges of the first arm 1 and the second arm 2 are regulated by the pair of first stoppers 131 and the pair of second stoppers 221 such that the first arm 1 and the second arm 2 are not opened at an angle exceeding a predetermined angle.

The second arm 2 has a pair of rising pieces 25 and 26 protruding rearward from both sides in the short direction (upward-downward direction). In a state where both the first cover 141 and the second cover 142 are closed, the upper rising piece 25 as one of the pair of rising pieces 25 and 26 protrudes to a position covering one surface (upper surface) of a body 32 of the detection unit 3 and the elastic body 4. Accordingly, an upward movement of the detection unit 3 is regulated by the rising piece 25. In other words, the arm (here, the second arm 2) that is one of the first arm 1 and the second arm 2 and does not hold the detection unit 3 has a regulating unit 23 (rising piece 25) regulating a unidirectional movement of the detection unit 3.

As described above, in the present embodiment, the detection unit 3 is held by the first arm by the pair of pins 161 being respectively inserted from one direction (upward) into the pair of insertion holes 321 of the detection unit 3. This configuration is advantageous in that it is easy to assemble the detection unit 3 to the first arm 1 and assemblability is improved. Even so, the detection unit 3 may move in one direction (upward) and fall in this case, and thus the detection unit 3 is prevented from falling by the regulating unit 23 of the second arm 2. In the present embodiment, the rotation ranges of the first arm 1 and the second arm 2 are regulated by the pair of first stoppers 131 and the pair of second stoppers 221 such that the regulating unit 23 of the second arm 2 overlaps the detection unit 3 at all times. Accordingly, the detection unit 3 is prevented from falling by the regulating unit 23 even in a case where either the first cover 141 or the second cover 142 is open.

The lower rising piece 26 as one of the pair of rising pieces 25 and 26 protrudes to a position covering the elastic body 4 in a state where both the first cover 141 and the second cover 142 are closed. Accordingly, a movement of the elastic body 4 in the upward-downward direction is regulated by the pair of rising pieces 25 and 26. In other words, the arm (here, the second arm 2) that is one of the first arm 1 and the second arm 2 and provided with the elastic body 4 positioned between the detection unit 3 and itself has a guide unit 24 (pair of rising pieces 25 and 26). The guide unit 24 regulates a movement of the elastic body 4 in a direction orthogonal to the direction in which the elastic body 4 expands and contracts. This configuration is advantageous in that expansion and contraction of the elastic body 4 are facilitated along the expansion and contraction direction (forward-rearward direction) and buckling of the elastic body 4, which is a coil spring, is prevented with ease as a result.

The detection unit 3 has the actuator 31, the body 32, and the connecting portion 33. The actuator 31 has a plate shape that is long in one direction. The body 32 has a rectangular parallelepiped shape, and a contact point (not illustrated) is stored in the body 32. The body 32 has the pair of holding holes 321 penetrating the body 32 in the thickness direction (upward-downward direction). The connecting portion 33 is used for electrical connection to an external circuit in the detection unit 3. A pair of electric wires 34 (lead wires) are connected to the connecting portion 33. In the present embodiment, the external circuit is a processing unit (not illustrated) of the image forming apparatus 100. The processing unit serves to receive the output of the detection unit 3 and control the operating electric power to the image reading unit 110 and the image forming unit 120.

The elastic body 4 is a coil spring that expands and contracts in one direction (forward-rearward direction in FIG. 7). A first end (front end) of the elastic body 4 is held by the second arm 2 by being fitted to the attachment portion of the second arm 2. A second end (rear end) of the elastic body 4 is a free end. The elastic body A is disposed such that the second end faces the actuator 31 of the detection unit 3. Accordingly, the elastic body 4 expands and contracts between the second arm 2 and the actuator 31.

In the actuator 31 of the detection unit 3, the tolerance of the stroke that is required for switching from the OFF state to the ON state or the like is relatively as large as several millimeters. In addition, the second cover 142 as the detection target B2 is a molded article, and thus there are variations in component dimension and the like. Accordingly, it is difficult to design the detection device 10 so as to stably detect the opening and closing states of the first cover 141 and the second cover 142. For example, if the stroke for pushing in the first arm 1 during closing of the second cover 142 is increased, it is possible to realize stable detection independent of the above-described variations in component dimension and the like. In this case, however, an excessive force may act on the actuator 31 of the detection unit 3.

In the present embodiment, the elastic body 4 is provided between the actuator 31 and the second arm 2, and thus the excessive force that acts on the detection unit 3 from the second arm 2 is easily absorbed by the elastic body 4. Accordingly, the present embodiment is advantageous in that variations in component dimension and the like are easily allowed in design for stabilizing the detection of the opening and closing states of the first cover 141 and the second cover 142.

The support body 5 is a molded article and is stored in the housing 140 of the image forming apparatus 100. The support body 5 is fixed in the housing 140. The columnar shaft 51 protruding upward is provided on one surface (upper surface) of the support body 5. The shaft 51 is inserted in the hole 14 of the first arm 1. The shaft 51 has a shaft hole 511 penetrating the shaft 51 in the axial direction (upward-downward direction). Although not illustrated, the electric wire 34 connected to the connecting portion 33 passes through the shaft hole 511. In other words, it can be said that the electric wire 34 passes through the hole 14. In other words, the first arm 1 or the second arm 2 has the hole 14 through which the electric wire 34 connected to the connecting portion 33 passes.

In this configuration, the electric wire 34 is unlikely to be transmitted as a resistance hindering rotation of the first arm 1 even when the first arm 1 having the hole 14 rotates. Accordingly, this configuration is advantageous in that a force can be easily transmitted from the first cover 141 to the first arm 1. Accordingly, this configuration is advantageous in that the electric wire 34 does not become a resistance when a person closes the first cover 141 and the first cover 141 is closed with ease, that is, the first cover 141 is operated with ease. In addition, in the present embodiment, the first rotation axis A1 passes through the hole 14 as described above. In other words, in the present embodiment, the electric wire 34 passes through the rotation center of the first arm 1, and thus the present embodiment is advantageous in that the electric wire 34 becomes less likely to be transmitted as a resistance hindering rotation of the first arm 1.

In the present embodiment, the output of the detection unit 3 is switched to one of the two states depending on whether or not a force equal to or greater than a predetermined value is exerted on the detection unit 3 (actuator 31) from the first arm 1 and the second arm 2. In at least one of the first arm 1 and the second arm 2 (here, the first arm 1), a first distance is longer than a second distance. The first distance is the distance between the pressure receiving portion that is a force point (here, the first pressure receiving portion 11) and the rotation axis that is a fulcrum (here, the first rotation axis A1.). The second distance is the distance between an action point exerting a force on the detection unit 3 (actuator 31) and the rotation axis (here, the first rotation axis A1).

When the first pressure receiving portion 11 is pushed by the first cover 141 in this configuration, the first arm 1 exerts a force on the detection unit 3 by using the principle of the lever. Accordingly, with this configuration, it is possible to reduce the force that needs to be applied to the first arm 1 in order to exert a force equal to or greater than a predetermined value on the detection unit 3 when closing the first cover 141, that is, switching the detection unit 3 from the OFF state to the ON state. As a result, this configuration is advantageous in that it is possible to easily reduce the force that is required in closing the first cover 141.

Hereinafter, an example of the operation of the detection device 10 for detecting the states of the first cover 141 and the second cover 142 will be described.

As illustrated in FIG. 7, when the first pressure receiving portion 11 and the second pressure receiving portion 21 are respectively pushed by the first projection 143 and the second projection 144, the actuator 31 of the detection unit 3 is pushed to the second arm 2 with a force equal to or greater than a predetermined value via the elastic body 4. Accordingly, the output of the detection unit 3 is in the ON state.

Figure 8:
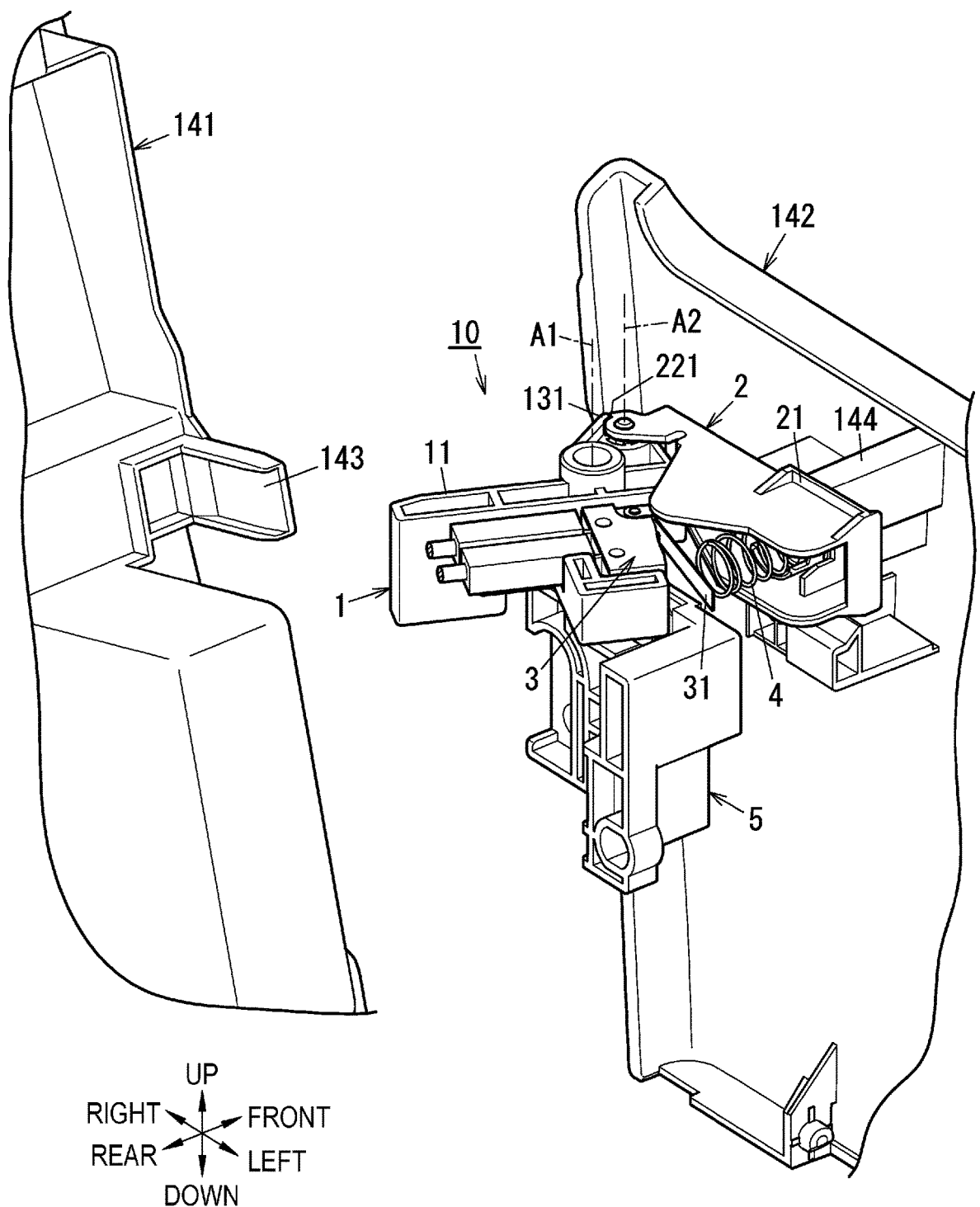
FIG. 8 is a perspective view of the detection device, illustrating a case where the first cover is open and the second cover is closed.

Here, it is assumed that the first projection 143 is separated from the first pressure receiving portion 11 by, for example, a person opening the first cover 141 with the detection device 10 in the state that is illustrated in FIG. 7. Then, the force that the first projection 143 applies to the detection unit 3 via the first arm 1 is lost and the elastic force that the elastic body 4 applies to the detection unit 3 causes the first arm 1 and the detection unit 3 to rotate as illustrated in FIG. 8. Accordingly, the elastic body 4 is separated from the actuator 31 and the actuator 31 is not pushed with a force equal to or greater than a predetermined value, and thus the output of the detection unit 3 is switched from the ON state to the OFF state.

Figure 9:
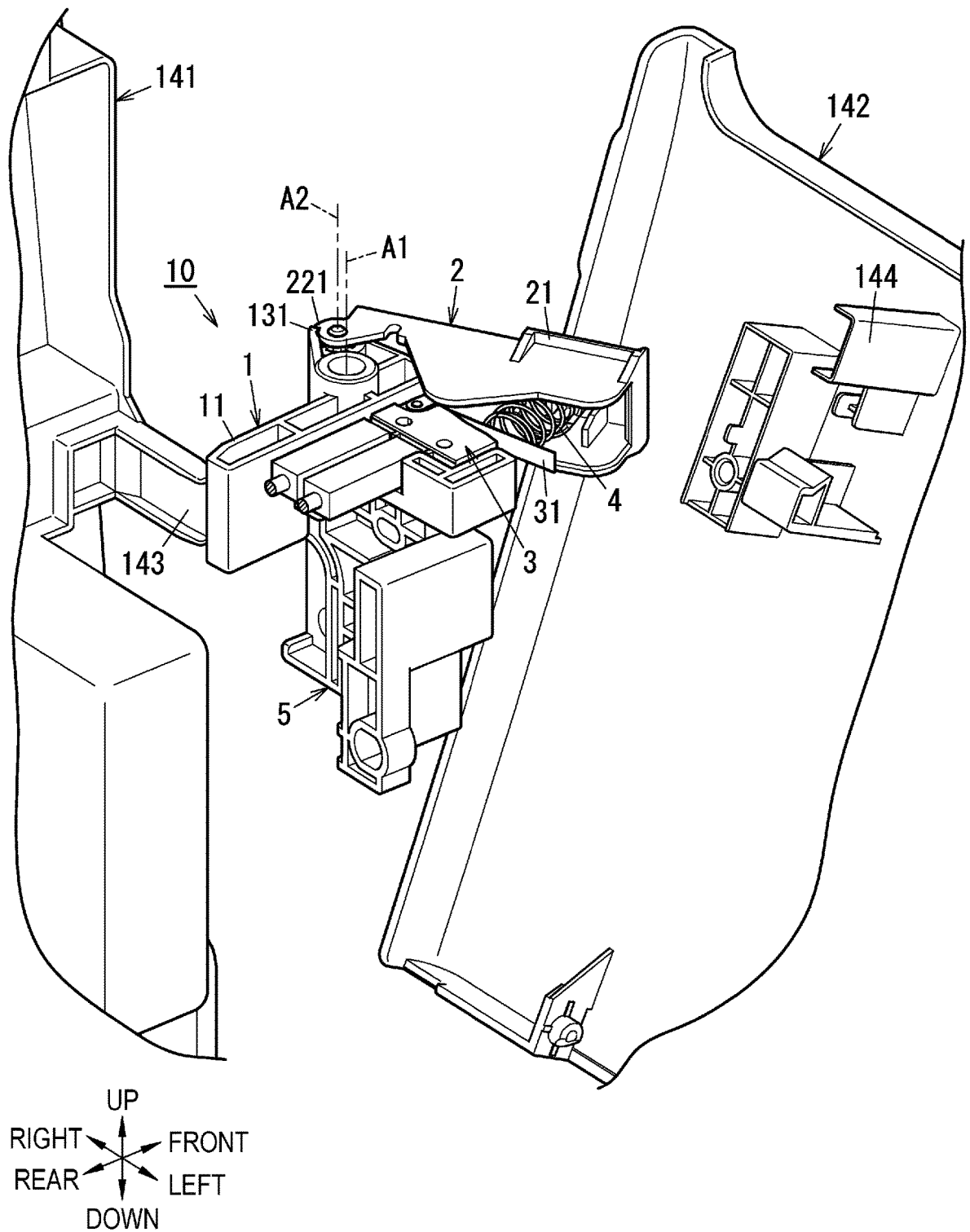
FIG. 9 is a perspective view of the detection device, illustrating a case where the first cover is closed and the second cover is open.

In addition, it is assumed that the second projection 144 is separated from the second pressure receiving portion 21 by, for example, a person opening the second cover 142 with the detection device 10 in the state that is illustrated in FIG. 7. Then, the force that the second projection 144 applies to the second arm 2 is lost and the elastic force that the elastic body 4 applies to the second arm 2 causes the second arm 2 to rotate as illustrated in FIG. 9. Accordingly, the elastic body 4 is separated from the actuator 31 and the actuator 31 is not pushed with a force equal to or greater than a predetermined value, and thus the output of the detection unit 3 is switched from the ON state to the OFF state.

In other words, in the present embodiment, the detection unit 3 is in the ON state when both the first cover 141 and the second cover 142 are closed, when at least one of the first cover 141 and the second cover 142 is opened, the detection unit 3 is switched from the ON state to the OFF state. Accordingly, the detection device 10 of the present embodiment is capable of detecting the opening and closing of the two detection targets B1 and B2 (first cover 141 and second cover 142) by using the single detection unit 3.

In the present embodiment, the image forming apparatus 100 is provided with a processing unit as described above. When the output of the detection unit 3 is in the ON state, the processing unit controls a switching element on an electric power supply path such that operating electric power is supplied to the image reading unit 110 and the image forming unit 120. When the output of the detection unit 3 is in the OFF state, the processing unit controls the switching element on the electric power supply path such that operating electric power supply to the image reading unit 110 and the image forming unit 120 is stopped. Accordingly, in the present embodiment, operating electric power supply to the image reading unit 110 and the image forming unit 120 is stopped when, for example, a person opens the first cover 141 or the second cover 142 in order to perform work such as maintenance of the image forming unit 120 and toner replacement.

(3) Modification Example

The above embodiment is only one of various embodiments of the present disclosure. Insofar as the object of the present disclosure can be achieved, the above embodiment can be modified in various ways depending on design and so on. Modification examples of the embodiment will be listed below. The modification examples described below are applicable in appropriate combination.

In the present embodiment, the longitudinal direction of the first arm 1 and the longitudinal direction of the second arm 2 are substantially orthogonal to each other. The present disclosure is not limited thereto. For example, the angle formed by the first arm 1 and the second arm 2 may be appropriately changed in accordance with the positions of the first detection target B1 and the second detection target B2.

Figure 10:
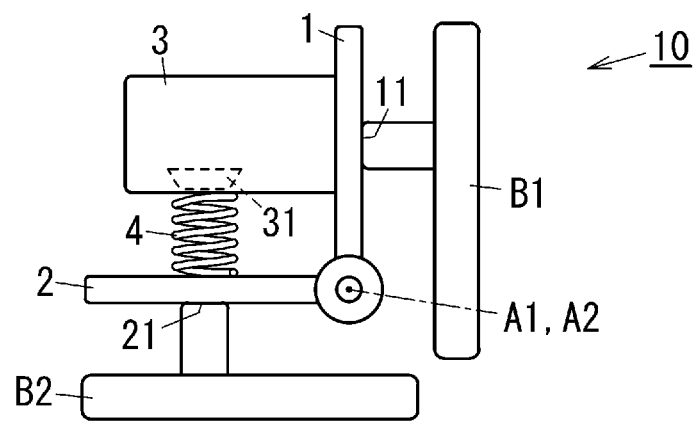
FIG. 10 is a schematic diagram of a detection device according to a modification example of an embodiment of the present disclosure.

In the present embodiment, the first rotation axis A1 and the second rotation axis A2 are completely parallel to each other. Alternatively, the first rotation axis A1 and the second rotation axis A2 may not be completely parallel to each other insofar as the first rotation axis A1 and the second rotation axis A2 are along the same straight line. For example, at least one of the first rotation axis A1 and the second rotation axis A2 may be inclined with respect to the straight line. In the present embodiment, the first rotation axis A1 and the second rotation axis A2 are different from each other. Alternatively, the first rotation axis A1 and the second rotation axis A2 may be the same. In other words, the first arm 1 and the second arm 2 may be rotatable about one rotation axis as a rotation center as illustrated in, for example, FIG. 10. Specifically, the detection device 10 may be configured such that the bearing 11 of the first arm 1 and the pair of bearings 22 of the second arm 2 are fitted to the shaft 51 of the support body 5. In this configuration, the shaft 13 of the first arm 1 is unnecessary.

Figure 11:
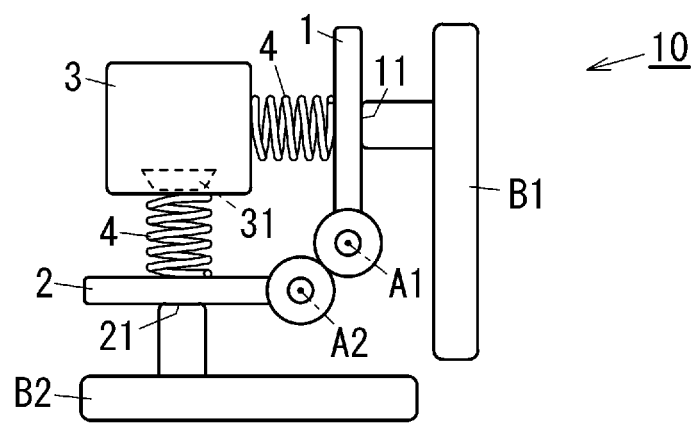
FIG. 11 is a schematic diagram of a detection device according to another modification example of an embodiment of the present disclosure.

In the present embodiment, the detection unit 3 is held by the first arm 1. Alternatively, the detection unit 3 may be held by the second arm 2. In addition, the detection unit 3 may be held neither by the first arm 1 nor by the second arm 2. For example, as illustrated in FIG. 11, the detection device 10 may be configured such that the elastic body 4 is further disposed between the detection unit 3 and the first arm 1. In this configuration, the second end of the elastic body 4 is a free end whereas the first end of the elastic body 4 is held by the first arm 1. In addition, in this configuration, the detection unit 3 is held by, for example, the support body 5 in a state where a certain degree of movement by the elastic force that the elastic body 4 applies to the detection unit 3 is allowed.

In the present embodiment, the second wall (left wall) of the first arm 1 is the wall 15 separating the connecting portion 33 from the pressure receiving portion (here, the first pressure receiving portion 11). The present disclosure is not limited thereto. For example, the wall 15 may be provided on the second arm 2. In addition, the wall 15 may be a member different from the first arm 1 and the second arm 2. In addition, the detection device 10 may lack the wall 15.

In the present embodiment, the first arm 1 holds the detection unit 3 in a state of being movable in one direction. The present disclosure is not limited thereto. For example, the detection unit 3 may be fixed to the first arm 1. In this case, the regulating unit 23 (rising piece 25) of the second arm 2 is unnecessary.

In the present embodiment, the second arm 2 has the guide unit 24 (pair of rising pieces 25 and 26). The present disclosure is not limited thereto. For example, the second arm 2 may have only one of the pair of rising pieces 25 and 26. In addition, the second arm 2 may lack the guide unit 24.

In the present embodiment, the detection device 10 has the elastic body 4. The present disclosure is not limited thereto. For example, the detection device 10 may lack the elastic body 4. In this configuration, the first arm 1 or the second arm 2 pushes the actuator 31 of the detection unit 3 when both the first cover 141 and the second cover 142 are closed, and thus the output of the detection unit 3 is maintained in the ON state. In addition, in this configuration, the actuator 31 returns to its original state once at least one of the first cover 141 and the second cover 142 is opened, and thus the output of the detection unit 3 is switched from the ON state to the OFF state.

In the present embodiment, the hole 14 is provided at the position through which the first rotation axis A1 passes. The present disclosure is not limited thereto. For example, the hole 14 may be provided at a position different from the position through which the first rotation axis A1 passes. In this case, the hole 14 is preferably provided near the first rotation axis A1 in order to avoid a movement of the electric wire 34 entailed by rotation of the first arm 1 as much as possible. In the present embodiment, the first arm 1 has the hole 14 through which the electric wire 34 passes. The present disclosure is not limited thereto. For example, the second arm 2 may have the hole 14. In this case, the second rotation axis A2 may pass through the hole 14. In addition, neither the first arm 1 nor the second arm 2 may have the hole 14.

In the present embodiment, the first distance is longer than the second distance in the first arm 1. The present disclosure is not limited thereto. For example, in the first arm 1, the first distance may be substantially equal to the second distance or may be shorter than the second distance. In the present embodiment, the first arm 1 is configured to exert a force on the detection unit 3 by using the principle of the lever when the first pressure receiving portion 11 is pushed by the first cover 141. The present disclosure is not limited thereto. For example, the second arm 2 may be configured to exert a force on the detection unit 3 by using the principle of the lever when the second pressure receiving portion 21 is pushed by the second cover 21.

In the present embodiment, the contact point of the detection unit 3 is a make contact point (a contact point). The present disclosure is not limited thereto. For example, the contact point of the detection unit 3 may be a break contact point (b contact point) or may be a make-break contact point (c contact point). In the present embodiment, the detection unit 3 is a microswitch. The present disclosure is not limited thereto. For example, the detection unit 3 may be another momentary-type switch such as a push button switch and a slide switch.

In the present embodiment, the first end (front end) of the elastic body 4 is held by the second arm 2. The present disclosure is not limited thereto. For example, the second end (rear end) of the elastic body 4 may be held by the actuator 31 of the detection unit 3. In the present embodiment, the elastic body 4 is a coil spring. The present disclosure is not limited thereto. For example, the elastic body 4 may be a configuration applying an elastic force in a direction away from the detection targets B1 and B2 to the detection unit 3, examples of which include a leaf spring, a torsion spring, rubber, and a sponge. In the present embodiment, the elastic body 4 is a metallic spring. Alternatively, the elastic body 4 may be a resinous spring.

Here, in order to reduce the load at a time when a person closes the second cover 142, it is preferable that the elastic force of the elastic body 4 acts as little as possible on the second cover 142. Accordingly, it is preferable that the elastic body 4 is a coil spring hardly varying in shape and facilitating load adjustment rather than a leaf spring likely to vary in shape and unlikely to facilitate load adjustment.

In the present embodiment, the first cover 141 is configured to push the first pressure receiving portion 11 of the first arm 1 via the first projection 143. The present disclosure is not limited thereto. For example, the first cover 141 that lacks the first projection 143 may push the first pressure receiving portion 11 of the first arm 1. In the present embodiment, the second cover 142 is configured to push the second pressure receiving portion 21 of the second arm 2 via the second projection 144. The present disclosure is not limited thereto. For example, the second cover 142 that lacks the second projection 144 may push the second pressure receiving portion 21 of the second arm 2.

In the present embodiment, both the first cover 141 and the second cover 142 are rotary covers. The present disclosure is not limited thereto. For example, at least one of the first cover 141 and the second cover 142 may be a slide cover. At least one of the first cover 141 and the second cover 142 may be detachable from the housing 140.

In the present embodiment, the first pressure receiving portion 11 and the second pressure receiving portion 21 are directly pushed by the first detection target B1 and the second detection target B2, respectively. The present disclosure is not limited thereto. For example, the first pressure receiving portion 11 and the second pressure receiving portion 21 may be indirectly pushed by the first detection target B1 and the second detection target B2 via another member such as an insulating sheet, respectively.

Although the detection device 10 is used for detecting the states of the first cover 141 and the second cover 142 of the image forming apparatus 100 in the present embodiment, the applications of the detection device 10 are not limited. For example, the detection device 10 can also be used to detect the states of two covers having equipment such as a server. In other words, the detection device 10 can be applied to any equipment having the two different detection targets B1 and B2 (including electronic equipment, a vehicle, a ship, a building, or another mechanical apparatus).

(Summary)

As described above, a detection device (10) according to a first aspect includes a first arm (1), a second arm (2), and a detection unit (3). The first arm (1) and the second arm (2) each have corresponding pressure receiving portion (11 and 21) pushed by one of detection targets (B1 and B2) different from each other. The detection unit (3) has two states as output. The first arm (1) and the second arm (2) are respectively rotatable about rotation axes (A1 and A2) as rotation centers along the same straight line such that the first arm (1) and the second arm (2) have different positions when the corresponding pressure receiving portion (11 and 21) is pushed by one of the detection targets (B1 and B2) and when the pressure receiving portion (11 and 21) is not pushed by one of the detection targets (B1 and B2). The output of the detection unit (3) is switched to one of the two states in accordance with the positions of the first arm (1) and the second arm (2).

According to this aspect, the first arm (1) and the second arm (2) correspond one to one to the two detection targets (B1 and B2), respectively. Therefore, according to this aspect, individual arm operation adjustment is performed with ease as compared with a configuration in which two doors are detected by means of one operating member as in the door opening and closing detection device described in Japanese Unexamined Patent Application Publication No. 10-199364. According to this aspect, both the first arm (1) and the second arm (2) perform the same operation (rotational operation) by being pushed by the detection targets (B1 and B2). Therefore, according to this aspect, individual arm operation adjustment is performed with ease as compared with a configuration in which two different operations are performed by one operating member as in the door opening and closing detection device described in Japanese Unexamined Patent Application Publication No. 10-199364. Therefore, this aspect is advantageous in that detection of the states of the detection targets (B1 and B2) is stabilized with ease.

According to a second aspect, in the detection device (10) of the first aspect, the detection unit (3) is held by the first arm (1) or the second arm (2).

According to this aspect, the arm that holds the detection unit (3) operates in conjunction with the detection unit (3), and thus this aspect is advantageous in that there is no need to consider the positional relationship with the detection unit (3) in design.

According to a third aspect, the detection device (10) of the second aspect further includes a wall (15). The wall (15) separates a connecting portion (33) used for electrical connection to an external circuit in the detection unit (3) and the pressure receiving portion (11 or 21) of the arm holding the detection unit (3) as the first arm (1) or the second arm (2) from each other.

This aspect is advantageous in that it is easy to prevent the detection targets (B1 and B2) from touching the connecting portion (33).

According to a fourth aspect, in the detection device (10) of the third aspect, the wall (15) is in the arm holding the detection unit (3) as the first arm (1) or the second arm (2).

This aspect is advantageous in that the number of parts can be reduced as compared with a case where a part independent of the first arm (1) and the second arm (2) constitutes the wall (15).

According to a fifth aspect, in the detection device (10) of the second aspect, the first arm (1) or the second arm (2) holds the detection unit (3) in a state of being movable in one direction. The arm not holding the detection unit (3) as the first arm (1) or the second arm (2) includes a regulating unit (23) regulating a movement of the detection unit (3) in the one direction.

This aspect is advantageous in that it is easy to assemble the detection unit (3) from one direction with respect to the first arm (1) or the second arm (2) and assemblability is improved as compared with a case where the detection unit (3) is fixed to the first arm (1) or the second arm (2).

According to a sixth aspect, the detection device (10) of any one of the first to fifth aspects further includes an elastic body (A). The elastic body (4) is disposed between the detection unit (3) and at least one of the first arm (1) and the second arm (2) and causes an elastic force in a direction away from the detection targets (B1 and B2) to act on the detection unit (3).

According to this aspect, the excessive force that acts on the detection unit (3) from the detection targets (B1 and B2) is easily absorbed by the elastic body (4). Therefore, this aspect is advantageous in that variations in component dimension and the like are easily allowed in design for stabilizing the detection of the states of the detection targets (B1 and B2).

According to a seventh aspect, in the detection device (10) of the sixth aspect, the elastic body (4) is a coil spring. The first arm (1) or the second arm (2) provided with the elastic body (4) positioned between the detection unit (3) and the arm includes a guide unit (24) regulating a movement of the elastic body (4) in a direction orthogonal to a direction in which the elastic body (4) expands and contracts.

This aspect is advantageous in that it is easy to prevent buckling of the elastic body (4) as a movement in a direction other than the direction in which the elastic body (4) expands and contracts is regulated.

According to an eighth aspect, in the detection device (10) of any one of the first to seventh aspects, the detection unit (3) includes a connecting portion (33) used for electrical connection to an external circuit. The first arm (1) or the second arm (2) includes a hole (14) through which an electric wire (34) connected to the connecting portion (33) passes.

According to this aspect, the electric wire (34) is unlikely to be transmitted as a resistance hindering arm rotation even when the arm having the hole (14) rotates. Accordingly, this aspect is advantageous in that a force can be easily transmitted from the detection targets (B1 and B2) to the arm having the hole (14).

According to a ninth aspect, in the detection device (10) of the eighth aspect, the rotation axis (A1 or A2) as the rotation center of the arm including the hole (14) as the first arm (1) or the second arm (2) passes through the hole (14).

This aspect is advantageous in that the electric wire (34) becomes less likely to be transmitted as a resistance hindering arm rotation even when the arm having the hole (14) rotates.

According to a tenth aspect, in the detection device (10) of any one of the first to ninth aspects, the rotation axis (A1) as the rotation center of the first arm (1) and the rotation axis (A2) as the rotation center of the second arm (2) are different from each other.

This aspect is advantageous in that the positional relationship between the first arm (1) and the detection unit (3) and the positional relationship between the second arm (2) and the detection unit (3) are individually adjusted with ease.

According to an eleventh aspect, in the detection device (10) of any one of the first to ninth aspects, the rotation axis (A1) as the rotation center of the first arm (1) and the rotation axis (A2) as the rotation center of the second arm (2) are the same.

This aspect is advantageous in that it is easy to adjust the positional relationships of the first arm (1) and the second arm (2) together.

An image forming apparatus (100) according to a twelfth aspect includes the detection device (1) of any one of the first to eleventh aspects, an image forming unit (120), a first cover (141), and a second cover (142). The image forming unit (120) performs image formation. The first cover (141) covers at least a part of the image forming unit (120) as the detection target (B1) pushing the corresponding pressure receiving portion (11) of the first arm (1). The second cover (142) covers at least a part of the image forming unit (120) as the detection target (B2) pushing the corresponding pressure receiving portion (21) of the second arm (2).

This aspect is advantageous in that detection of the opening and closing states of the first cover (141) and the second cover (142) is stabilized with ease.

The configurations according to the second to eleventh aspects are not indispensable for the detection device (10) and the configurations can be appropriately omitted.

The present disclosure contains subject matter related to that disclosed in Japanese Priority Patent Application JP 2018-011701 filed in the Japan Patent Office on Jan. 26, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof

What is claimed is:

1. A detection device comprising:
a first arm and a second arm each including a corresponding pressure receiving portion pushed by one of detection targets different from each other; and
a detection unit having two states as output, wherein
the first arm and the second arm are respectively rotatable about rotation axes as rotation centers along the same straight line such that each of the first arm and the second arm has different positions when the corresponding pressure receiving portion is pushed by the detection target and when the corresponding pressure receiving portion is not pushed by the detection target, and
the output of the detection unit is switched to one of the two states in accordance with the positions of the first arm and the second arm, wherein
the detection unit is held by the first arm or the second arm,
the first arm or the second arm holds the detection unit in a state of being movable in one direction, and
the arm not holding the detection unit as the first arm or the second arm includes a regulating unit regulating a movement of the detection unit in the one direction.

2. The detection device according to claim 1, further comprising an elastic body disposed between the detection unit and at least one of the first arm and the second arm and causing an elastic force in a direction away from the detection target to act on the detection unit.

3. The detection device according to claim 2, wherein the elastic body is a coil spring, and
the first arm or the second arm provided with the elastic body positioned between the detection unit and the arm includes a guide unit regulating a movement of the elastic body in a direction orthogonal to a direction in which the elastic body expands and contracts.

4. A detection device comprising:
a first arm and a second arm each including a corresponding pressure receiving portion pushed by one of detection targets different from each other; and
a detection unit having two states as output, wherein
the first arm and the second arm are respectively rotatable about rotation axes as rotation centers along the same straight line such that each of the first arm and the second arm has different positions when the corresponding pressure receiving portion is pushed by the detection target and when the corresponding pressure receiving portion is not pushed by the detection target, and
the output of the detection unit is switched to one of the two states in accordance with the positions of the first arm and the second arm,
wherein
the detection unit includes a connecting portion used for electrical connection to an external circuit, and
the first arm or the second arm includes a hole through which an electric wire connected to the connecting portion passes.

5. The detection device according to claim 4, wherein the rotation axis as the rotation center of the arm including the hole as the first arm or the second arm passes through the hole.

6. An image forming apparatus comprising:
a detection device comprising:
a first arm and a second arm each including a corresponding pressure receiving portion pushed by one of detection targets different from each other; and
a detection unit having two states as output, wherein
the first arm and the second arm are respectively rotatable about rotation axes as rotation centers along the same straight line such that each of the first arm and the second arm has different positions when the corresponding pressure receiving portion is pushed by the detection target and when the corresponding pressure receiving portion is not pushed by the detection target, and
the output of the detection unit is switched to one of the two states in accordance with the positions of the first arm and the second arm,
an image forming unit performing image formation;
a first cover covering at least a part of the image forming unit as the detection target pushing the corresponding pressure receiving portion of the first arm; and
a second cover covering at least a part of the image forming unit as the detection target pushing the corresponding pressure receiving portion of the second arm.

7. The detection device according to claim 6, wherein the rotation axis as the rotation center of the first arm and the rotation axis as the rotation center of the second arm are the same.

8. The detection device according to claim 6, wherein the rotation axis as the rotation center of the first arm and the rotation axis as the rotation center of the second arm are different from each other.

* * * * *